Patented Apr. 16, 1940

2,197,718

UNITED STATES PATENT OFFICE 2,197,718

CHEWING GUM

Herbert W. Conner, Chicago, Ill., assignor to Wm. Wrigley, Jr. Company, Chicago, Ill., a corporation of Delaware No Drawing. Application December 7, 1938, Serial No. 244,421

15 Claims. (Cl. 99—135)

My invention relates to chewing gum and is particularly concerned with the preparation of products having unusually satisfactory properties and characteristics.

In the art of preparing chewing gum, it has heretofore been customary, in order to produce products of high quality, to utilize mixtures of chicle and jelutong as the base materials, although experience has demonstrated that such bases are open to certain objections. In recent years, various products have been suggested and developed for the purpose of producing improved chewing gums with respect to texture, chew, and other properties. While these products serve a purpose, none has proven to be fully satisfactory.

The ideal chewing gum must possess various properties, among which may be mentioned, for example, smoothness, non-adhesiveness or lack of tackiness, and a proper degree of cohesiveness, resiliency, and stretch in order to make for the desired chewing characteristics. In order to achieve such properties to some degree or other, it has been more or less conventional practice to employ various materials in the chewing gum mix as, for example, paraffin wax, spermaceti, ceresin wax, candelilla wax, carnauba wax, stearine, petrolatum, cocoa butter and the like. While the use of these materials brings about improvements in certain characteristics of the final chewing gum product, usually these improvements are obtained at a sacrifice of other desired properties. Thus, for example, while ordinary paraffin wax, which has a melting point of from about 110 degrees F. to a maximum of about 149 degrees F., ordinarily of about 118 degrees F. to 130 degrees F. as usually employed in chewing gum mixes, tends to impart desired smoothness to chewing gum mixes, it also possesses the undesirable feature of rendering the final chewing gum too plastic and tacky and, in addition, it imparts other objectionable properties to the chewing gum. Again, for example, cocoa butter has a smoothing action on chewing gum mixes but, when used in sufficient quantities to achieve this function to any appreciable extent, it brings about such a substantial loss of cohesion and firmness in the chewing gum mixes as to preclude its use as a practical smoothing agent.

I have discovered that the addition of lanolin to chewing gum mixes has the entirely unexpected properties of appreciably decreasing tackiness and reducing the cohesive properties of the chewing gum to the desired extent. It also has a slight smoothing effect upon chewing gum mixes and is substantially free of the tendency to reduce the elasticity of the chew. The invention appears to possess its most important utility in connection with chewing gums containing a high percentage of jelutong and other eastern guttas and the like which are characterized by high cohesiveness. It is, however, also of substantial value in the improvement of chewing gum mixes in general as prepared from the various bases and mixtures thereof as are hereinafter described.

I have also found that the employment of phosphatides, such as commercial soya bean lecithin, in conjunction with lanolin in chewing gum mixes brings about still further improvements, particularly with respect to avoidance of loss of elasticity. In my copending application, Serial No. 244,459, filed of even date herewith, I have disclosed and claimed the use of phosphatides in chewing gum mixes to obtain important improvements in smoothness, reduction of tackiness, regulation of cohesiveness, and in other ways. While the phosphatides will render smooth any chew which is rough, if the chew is exceedingly rough the amount of lecithin required to bring about smoothness may be sufficiently great so as to cause an undesired loss of elasticity of the chewing gum. In such, and in other instances as well, I have found that both lanolin and a phosphatide function cooperatively in chewing gums to bring about a desired reduction in cohesion and a satisfactory smoothing effect without undue impairment of elasticity.

In order that those skilled in the art may even more fully appreciate the scope of the invention, I list hereinbelow specific embodiments for carrying out the novel teachings of my invention. It will be understood that these embodiments are illustrative and in no wise limitative of the full scope of my invention. Thus, for example, different base mixtures of gums, guttas, resins and the like may be utilized, with or without supplemental agents such as those previously listed, the proportions of the ingredients may be varied, and the amounts and character of the lanolin and phosphatide are likewise variable within limits without departing from the spirit and teachings of my invention herein. All percentages referred to are by weight.

EXAMPLE I

Chewing gum base

| | Per cent |
|---|---|
| Ester gum | 88.0 |
| Rubber latex solids | 10.0 |
| Lanolin | 2.0 |

Example II

*Chewing gum base*

| | Per cent |
|---|---|
| Chicle | 30.0 |
| Jelutong (dry) | 60.0 |
| Gutta soh | 8.5 |
| Lanolin | 1.5 |

Example III

*Chewing gum base*

| | Per cent |
|---|---|
| Crown gum | 98.0 |
| Lanolin | 2.0 |

Example IV

*Chewing gum base*

| | Per cent |
|---|---|
| Jelutong (dry) | 80.0 |
| Gutta siak | 18.0 |
| Commercial soya bean lecithin | 1.2 |
| Lanolin | 0.8 |

Example V

*Chewing gum base*

| | Per cent |
|---|---|
| Jelutong (dry) | 98.0 |
| Lanolin | 1.3 |
| Commercial soya bean licithin | 0.7 |

In order to prepare a chewing gum from the base materials set forth above in the illustrative examples, I proceed in accordance with well known and established practice. Thus, for example, I prepare a chewing gum mix employing about 20% of the chewing gum base, about 60% of pulverized sugar (sucrose), about 19% commercial corn syrup, and about 1% of a desired flavor. The mixture is then rolled into sheets and scored in a manner known in the art.

In the examples listed hereinabove, I have employed commercial soya bean lecithin containing approximately 20% of cocoa butter. This product is made by treating the phosphatide material with acetone to remove soya bean oil, adding cocoa butter to the phosphatide material and then evaporating off the acetone. In place of such lecithin preparations, allied or related materials may be employed such as the vegetable phosphatides derived from plant material other than soya beans, animal phosphatides derived from egg yolks, from cerebrospinal or brain tissue, and the like, and containing lecithins, cephalins, syhingomyelin, and generally similar lipoids. Again, synthetically prepared lecithins may be utilized. For commercial and other reasons, I prefer particularly to employ soya bean lecithin. It will be understood, of course, that the lecithin or phosphatides and the lanolin should be of proper quality to be used in food products. I have obtained highly satisfactory results with so-called anhydrous U. S. P. lanolin free of undesirable flavor and odor.

While the lanolin or the lanolin and phosphatides may, of course, be incorporated into the chewing gum batch at any desired or suitable stage of the chewing gum manufacturing process, I have found it to be highly advantageous to effect the incorporation during the steps of purifying and clarifying the chewing gum base. In accordance with such procedure, the chewing gum base, which may be jelutong or blends of jelutong with chicle and/or other chicle substitutes, in ground and dried form, is placed in the usual pressure cooker together with the lanolin or the lanolin and phosphatide, and with or without additional moisture, and maintained therein, with agitation, under a steam pressure sufficient to melt the mass. The melted mass is then filtered, at elevated temperatures, through a coarse mesh screen to remove large particle impurities and it is then centrifuged to clarify the same. The presence of the phosphatide results in the necessity for a lower rate of centrifuging which means that the base mixture must remain in the centrifugal bowl for a longer period of time. The procedure, however, possesses the advantage of insuring greater sedimentation and, therefore, a cleaner or purer and more fluid mass. Furthermore, the addition of the phosphatide facilitates the melting process.

The proportions of the lanolin and phosphatide employed in the final chewing gum product or in the chewing gum base from which the chewing gum proper is prepared are subject to relatively wide variation. In general, proportions of the order of about 0.3% to about 3.0% of lanolin, based on the weight of the chewing gum base, are effective, the preferred range in most cases being from about 0.7% to about 2.5%, based on the weight of the base. Calculated on the weight of the finished chewing gum product, the percentage range is of the order of about 0.06% to 0.6%, with the preferred range running from about .1% to about 0.5%.

The proportion of phosphatide, where the same is employed together with the lanolin in the chewing gum, is also variable, usually ranging from about 0.5% to 3.0%, calculated on the weight of the chewing gum base. This amounts to about 0.1% to 0.6% of phosphatide predicated on the finished chewing gum. In general, it is preferred to employ somewhat more phosphatide than lanolin, usually of the order of three to two or two to one, but the amount of lanolin and phosphatide together should ordinarily not exceed 5% calculated on the weight of the chewing gum base and should preferably fall within the range of about 1.5% and 2.5%. Determined on the weight of the finished chewing gum, the combined percentage of lanolin and phosphatide should be less than 1.0%. It will be understood that the exact percentages selected depend upon the nature of the chewing gum base, the potency of the phosphatide employed, and the exact character of the ultimate results desired. Those versed in the art will be able readily to choose proper amounts of the lanolin or lanolin and phosphatide in the light of the guiding principles which I have disclosed herein.

So far as the production of a lanolin-rich or a lanolin-phosphatide-rich chewing gum base is concerned, the lanolin or lanolin and phosphatide may comprise a high percentage thereof. Thus, for example, the lanolin or lanolin and phosphatide may comprise as high as 90% by weight or more of the entire base or it may be as low as 10% and even much lower. In such cases, of course, these base mixtures are mixed with an additional amount of a suitable or desired chewing gum base material to bring the content of the lanolin or lanolin and phosphatide down to the percentage sought. In other cases, it is convenient and preferable to prepare a chewing gum base mixture containing the desired gums or guttas or the like together with the selected amount of lanolin or lanolin and phosphatide. To prepare a chewing gum from such a base, it is then necessary only to mix the same with the proper proportions of sugar, corn syrup, flavoring and/or other ingredients which may be desired.

A particularly useful chewing gum base is one containing from about 30% to 70% of jelutong, from about 70% to 30% of chicle, and minor proportions of lanolin or lanolin and phosphatide, for example, from about 0.6% to about 3.0% of lanolin or lanolin and commercial soya bean lecithin. It will be understood, however, that other chewing gum base mixtures may be made containing varying proportions of resins, guttas, chicle and chicle substitutes, and varying proportions of lanolin or lanolin and phosphatides, with or without the addition of oleaginous and waxy materials such as those mentioned hereinabove. I have also found it to be desirable to prepare compositions consisting essentially of phosphatide or lecithins and lanolin, wherein the phosphatide ranges from 25% to 75% and the lanolin from 75% to 25% by weight of the composition.

The lanolin or lanolin and phosphatides may be utilized, in accordance with my novel teachings herein, to improve markedly any of the usual chewing gum bases or mixtures of any two or more thereof including, for example, in addition to those previously mentioned, gutta percha, balata, Perillo, Leche Caspi, resins and resenes including coumarone-indene resins, vinyl resins, petroleum resins, gutta katiau, mastic, kauri, dammar, and the like, with or without chicle and with or without modifying agents such as hydrogenated oils, mineral oils, paraffin, beeswax, gum arabic, stearine, and other oleaginous and waxy agents such as those heretofore mentioned and which are sometimes added to chewing gum mixes for obtaining particular effects. The present invention is of unusual utility in connection with chewing gums prepared from chicle or jelutong or mixtures thereof. This is particularly true in the case of chicle where the chicle has undergone some oxidation whereby its ordinarily relatively smooth characteristics have suffered deterioration. The invention is also of particular importance in connection with bases such as gutta soh, gutta siak, gutta katiau, and Leche Caspi, alone or in admixture with chicle or jelutong.

Wherever the term "chewing gum material" is employed in the claims, it will be understood to cover the chewing gum bases as well as the finished chewing gum, unless the connotation otherwise expressly indicates.

While I have described my invention in detail, it will be understood that variations and modifications may be made without departing from the spirit thereof, as exemplified by the appended claims.

What I claim as new and desire to protect by Letters Patent of the United States is:

1. Chewing gum including lanolin and jelutong.
2. Chewing gum containing a minor proportion of lanolin.
3. Chewing gum containing between about 0.1% and 0.6% by weight of lanolin.
4. Chewing gum including a phosphatide and lanolin.
5. Chewing gum material including lecithin and lanolin.
6. Chewing gum material including a phosphatide, lanolin and jelutong.
7. Chewing gum including lecithin, lanolin and jelutong.
8. Chewing gum containing less than 1.0% by weight of a total of lecithin and lanolin.
9. Chewing gum containing jelutong and between about 0.1% and 0.5% lanolin and between about 0.1% and 0.6% of commercial lecithin, the total quantity of lanolin and commercial lecithin being less than 1.0% by weight of the chewing gum.
10. A chewing gum base including lanolin.
11. A chewing gum base including lanolin and jelutong.
12. A chewing gum base including lecithin, lanolin, and jelutong.
13. A chewing gum improving composition, adapted to impart smoothness to chewing gum when incorporated thereinto in minor amounts, comprising lecithin and lanolin.
14. A chewing gum improving composition, adapted to impart smoothness to chewing gum when incorporated thereinto in minor amounts, comprising from about 25% to 75% of lecithin and about 75% to 25% of lanolin.
15. A chewing gum composition, adapted to impart smoothness to chewing gum when incorporated thereinto in minor amounts, comprising a phosphatide and lanolin.

HERBERT W. CONNER.